United States Patent
Hu et al.

(10) Patent No.: US 11,290,167 B2
(45) Date of Patent: Mar. 29, 2022

(54) FREQUENCY DIVISION DUPLEX CHANNEL STATE INFORMATION ACQUISITION BASED ON KRONECKER PRODUCT

(71) Applicant: Samsung Electronics Co., Ltd., Suwon-si (KR)

(72) Inventors: Yeqing Hu, Allen, TX (US); Ahmed Atef Ibrahim, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/796,688

(22) Filed: Feb. 20, 2020

(65) Prior Publication Data

US 2020/0336187 A1 Oct. 22, 2020

Related U.S. Application Data

(60) Provisional application No. 62/859,762, filed on Jun. 11, 2019, provisional application No. 62/836,475, filed on Apr. 19, 2019.

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0452* (2013.01); *H04B 7/0469* (2013.01); *H04B 7/0639* (2013.01); *H04L 5/0051* (2013.01)

(58) Field of Classification Search
CPC .................................................. H04B 7/0626
(Continued)

(56) References Cited

U.S. PATENT DOCUMENTS

| 9,813,123 B2 | 11/2017 | Nam et al. |
| 2010/0035555 A1* | 2/2010 | Bala .................... H04B 7/06 455/63.1 |

(Continued)

FOREIGN PATENT DOCUMENTS

WO 2018/231812 A1 12/2018

OTHER PUBLICATIONS

International Search Report dated Jul. 15, 2020 in connection with International Patent Application No. PCT/KR2020/004742, 3 pages.

(Continued)

*Primary Examiner* — Lihong Yu

(57) ABSTRACT

A base station, method, and computer-readable storage medium for channel state information (CSI) acquisition. The base station includes a transceiver configured to transmit a first, unprecoded channel state information reference signal (CSI-RS) on a first antenna dimension; receive a first CSI report on the first antenna dimension; transmit a second, precoded CSI-RS on a second antenna dimension; and receive a second CSI report on the second antenna dimension. The first CSI report includes a precoding matrix index (PMI), a rank indicator (RI), and channel quality indicator (CQI) for the first antenna dimension; and the second CSI report comprises a PMI, a RI, and a CQI for the second antenna dimension. The base station also includes a processor operably connected to the transceiver, the processor configured to generate a downlink (DL) CSI for multi-user multi-input, multi-output (MU-MIMO) scheduling and precoding based on the first CSI report and the second CSI report.

20 Claims, 11 Drawing Sheets

(51) Int. Cl.
*H04B 7/0456* (2017.01)
*H04B 7/0452* (2017.01)

(58) Field of Classification Search
USPC .......................................................... 370/329
See application file for complete search history.

(56) References Cited

U.S. PATENT DOCUMENTS

| | | | |
|---|---|---|---|
| 2013/0343303 A1* | 12/2013 | Kim | H04B 7/0617 |
| | | | 370/329 |
| 2016/0337049 A1* | 11/2016 | Dhakal | H04B 17/21 |
| 2018/0034523 A1 | 2/2018 | Kim et al. | |
| 2018/0219603 A1* | 8/2018 | Park | H04B 7/0478 |
| 2019/0058560 A1 | 2/2019 | Chen et al. | |
| 2019/0068266 A1 | 2/2019 | Chang et al. | |
| 2019/0098660 A1 | 3/2019 | Rahman et al. | |
| 2020/0304190 A1* | 9/2020 | Na | H04B 7/0417 |

OTHER PUBLICATIONS

Written Opinion of the International Searching Authority dated Jul. 15, 2020 in connection with International Patent Application No. PCT/KR2020/004742, 5 pages.
Fangchao Zhang, et al., "Hybrid CSI-RS Transmission Mechanism-Based 3D Beamforming Scheme for FDD Massive MIMO System," China Communications, 2016, vol. 13, No. 2, pp. 109-119.
Fangchao Zhang, et al., "Enhanced CSI Acquisition for FDD Multi-User Massive MIMO Systems," IEEE Access, 2018, vol. 6, No. 2, pp. 23034-23042.

\* cited by examiner

US 11,290,167 B2

FREQUENCY DIVISION DUPLEX CHANNEL STATE INFORMATION ACQUISITION BASED ON KRONECKER PRODUCT

CROSS-REFERENCE TO RELATED APPLICATION AND CLAIM OF PRIORITY

This application claims priority under 35 U.S.C. § 119(e) to U.S. Provisional Patent Application No. 62/836,475 filed on Apr. 19, 2019, and to U.S. Provisional Patent Application No. 62/859,762 filed on Jun. 11, 2019. The above-identified provisional patent applications are hereby incorporated by reference in its entirety.

TECHNICAL FIELD

The present disclosure relates to a pre-$5^{th}$-Generation (5G) or 5G communication system to be provided for supporting higher data rates Beyond $4^{th}$-Generation (4G) communication system such as Long-Term Evolution (LTE). More particularly, the present disclosure is directed to channel state acquisition for acquiring channel state information in frequency division duplex using Kronecker product.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

Downlink (DL) massive MIMO (mMIMO) systems have mainly been implemented for time division duplex (TDD) bands, in which uplink (UL) & DL channel reciprocity holds. Exploiting channel reciprocity, DL channel state information (CSI) on the full DL band can be acquired at the base station (BS) using UL sounding reference signals (SRS) channel estimates. Relying on this full bandwidth DL CSI, frequency-selective multi-user MIMO (MU-MIMO) precoding can be performed. This frequency-selective precoding is important to demonstrate the MU-MIMO performance gain over single-user MIMO (SU-MIMO).

In contrast to TDD, channel reciprocity does not hold in general for frequency division duplex (FDD) bands. The channels in the UL BW are not the same as those in DL BW. DL CSI for FDD is usually obtained through UE feedback. Rel-13 and beyond has defined a full-dimensional MIMO codebook to support the 3D channel structure. However, legacy UEs (Rel-12 or earlier) do not support the full-dimensional MIMO codebooks. Instead, only 1 dimensional codebook is supported.

SUMMARY

Embodiments of the present disclosure include a base station, a method, and a computer-readable medium for FDD channel state information (CSI) acquisition. One embodiment is directed to a base station that includes a transceiver for communicating with a set of user equipments (UEs), the transceiver configured to transmit a first, unprecoded channel state information reference signal (CSI-RS) on a first antenna dimension; receive a first CSI report on the first antenna dimension; transmit a second, precoded CSI-RS on a second antenna dimension; and receive a second CSI report on the second antenna dimension. The first CSI report includes a precoding matrix index (PMI), a rank indicator (RI), and channel quality indicator (CQI) for the first antenna dimension; and the second CSI report comprises a PMI, a RI, and a CQI for the second antenna dimension. The base station also includes a processor operably connected to the transceiver, the processor configured to generate a downlink (DL) CSI for multi-user multi-input, multi-output (MU-MIMO) scheduling and precoding based on the first CSI report and the second CSI report.

In another embodiment, a method for FDD channel state information (CSI) acquisition is disclosed. The method includes steps of transmitting a first, unprecoded channel state information reference signal (CSI-RS) on a first antenna dimension; receiving a first CSI report on the first antenna dimension; transmitting a second, precoded CSI-RS on a second antenna dimension; receiving a second CSI report on the second antenna dimension; and generating a downlink (DL) CSI for multi-user multi-input, multi-output (MU-MIMO) scheduling and precoding based on the first CSI report and the second CSI report. The first CSI report includes a precoding matrix index (PMI), a rank indicator (RI), and channel quality indicator (CQI) for the first antenna dimension; and the second CSI report comprises a PMI, a RI, and a CQI for the second antenna dimension.

In yet another embodiment a non-transitory, computer-readable medium is disclosed. The non-transitory, computer-readable medium stores instructions that, when executed by a processor of a base station, cause the base station to transmit a first, unprecoded channel state information reference signal (CSI-RS) on a first antenna dimension; receive a first CSI report on the first antenna dimension; transmit a second, precoded CSI-RS on a second antenna dimension; receive a second CSI report on the second antenna dimension; and generate a downlink (DL) CSI for multi-user multi-input, multi-output (MU-MIMO) scheduling and precoding based on the first CSI report and the second CSI report. The first CSI report includes a precoding matrix index (PMI), a rank indicator (RI), and channel quality indicator (CQI) for the first antenna dimension; and the second CSI report comprises a PMI, a RI, and a CQI for the second antenna dimension.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

Novel aspects of this disclosure recognize that some CSI acquisition methods need to be designed on the BS side, to support full-dimensional MIMO channel structure without changing legacy UE-side operation. For example, some embodiments of this disclosure are directed to a method for the BS to generate multi-user precoders in full-dimensional MIMO system based on the legacy UE feedback. The BS exploits the structure of planar antenna array of massive MIMO and utilizes 2 CSI-RS processes to obtain UE CSI feedback on horizontal and vertical directions separately. Thereafter, precoded CSI-RS can be transmitted by the BS on at least one antenna dimension (i.e., v-dimension or h-dimension). The BS can also construct frequency division CSI using UE CSI feedback on two-dimensions.

Other novel aspects of this disclosure also recognize that radio resource control (RRC) overhead can be reduced by limiting how often a CSI-RS beam can be changed. These novel aspects, which will be discussed in more detail below, can be implemented in one or more components of a networked computing system.

Figure 1:
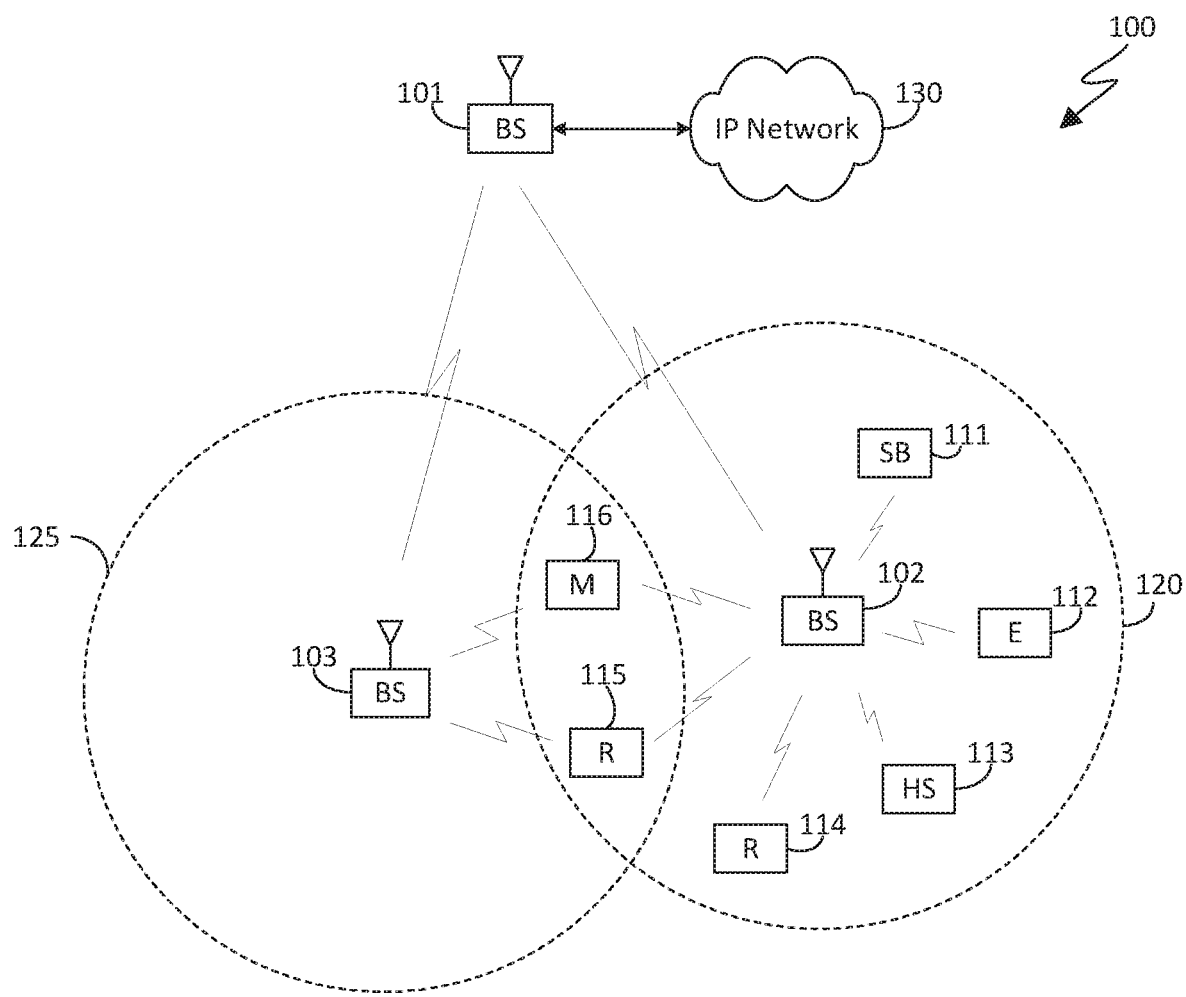
FIG. 1 illustrates an exemplary networked computing system according to various embodiments of this disclosure.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs in FIG. 1, such as UEs 111-116 can be legacy UEs capable of supporting only 1-D codebooks. Thus, one or more base stations, such as base BSs 101-103103, can be configured for CSI acquisition based on legacy UE feedback. The BS can construct a subband DL CSI for a legacy UE by taking a Kronecker product of the legacy UE's CSI on two dimensions. Thereafter, the BS can perform MU-MIMO scheduling, precoding, and DL transmissions with the legacy UEs.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
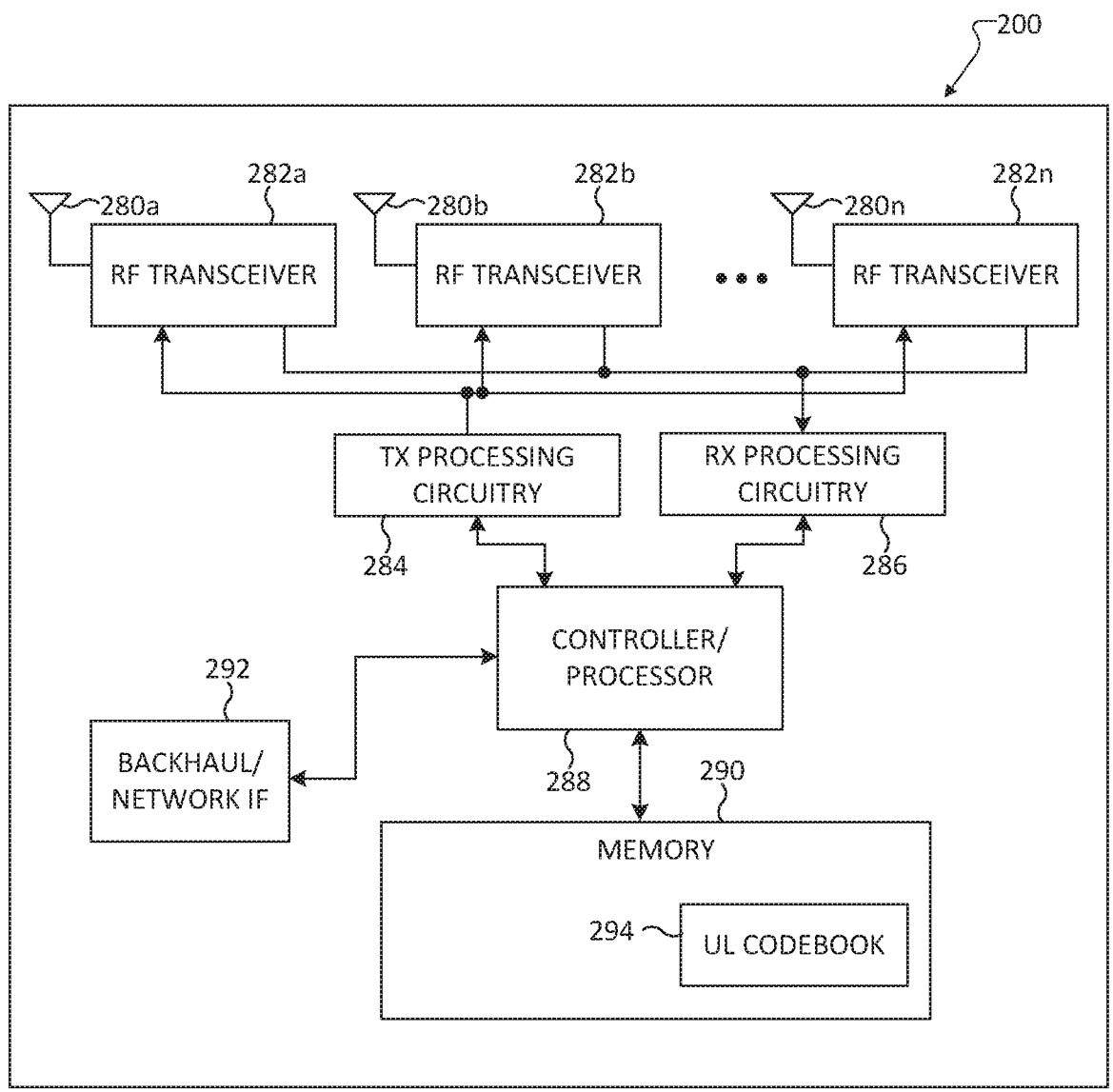
FIG. 2 illustrates an exemplary base station in the exemplary networked computing system according to various embodiments of this disclosure.

FIG. 2 illustrates an exemplary base station in the exemplary networked computing system according to various embodiments of this disclosure. Base station 200 can be a base station, such as base station 101 in FIG. 1. Further, the embodiment of the base station 200 illustrated in FIG. 2 is for illustration only and should not be deemed to limit the scope of this disclosure to any particular implementation of base station.

As shown in FIG. 2, the base station 200 includes multiple antennas 280a-280n, multiple RF transceivers 282a-282n, transmit (TX) processing circuitry 284, and receive (RX) processing circuitry 286. The base station 200 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the base station 200. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the base station 200 by the controller/processor 288. In some embodiments, the controller/processor 288 includes at least one microprocessor or microcontroller.

The controller/processor 288 is also capable of executing programs, instructions, and other processes resident in the memory 290, such as a basic OS. The controller/processor 288 can move data into or out of the memory 290 as required by an executing process. In one embodiment, memory 290 stores a 1-D UL codebook 294 storing a predefined set of wideband beams for precoding CSI-RSs based on a correlation with precoding matrix indices included in CSI reports.

The controller/processor 288 is also coupled to the backhaul or network interface 292. The backhaul or network interface 292 allows the base station 200 to communicate with other devices or systems over a backhaul connection or over a network. The interface 292 could support communications over any suitable wired or wireless connection(s). For example, when the base station 200 is implemented as part of a cellular communication system (such as one supporting 5G, LTE, or LTE-A), the interface 292 could allow the base station 200 to communicate with other base stations over a wired or wireless backhaul connection. When the base station 200 is implemented as an access point, the interface 292 could allow the base station 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

Although FIG. 2 illustrates an example of a device in a computing system, various changes may be made to FIG. 2. For example, various components in FIG. 2 could be combined, further subdivided, or omitted and additional components could be added according to particular needs. In addition, as with computing and communication networks, client devices and servers can come in a wide variety of configurations, and FIG. 2 does not limit this disclosure to any particular base station. Further, the base station 200 can include one or more data units and one or more multiple massive MIMO units (MMU units) as depicted in FIG. 3 that follows.

Figure 3:
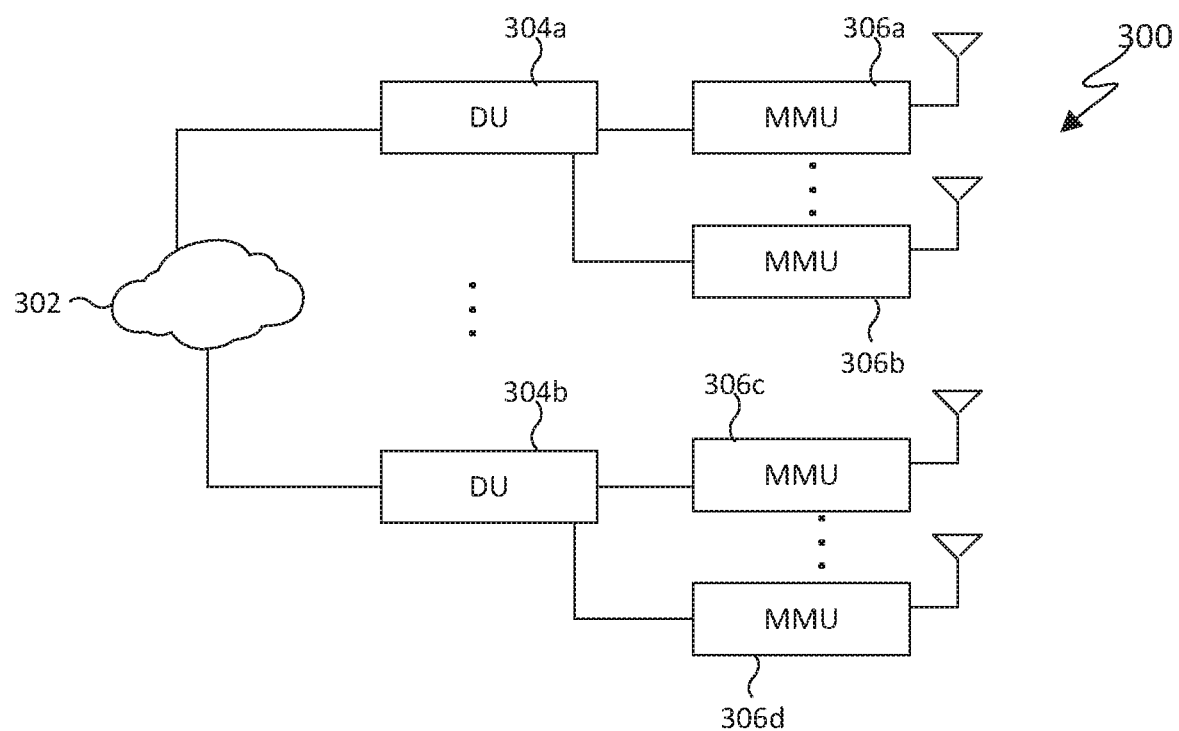
FIG. 3 illustrates an exemplary network architecture for multi-user, massive multi-input, multi-output (MU-MIMO) communication according to various embodiments of this disclosure.

FIG. 3 illustrates an exemplary network architecture for massive multi-input, multi-output (MIMO) communication according to various embodiments of this disclosure. The network architecture 300 can be included in the computing system 100 in FIG. 1. For example, network 302 may be a part of network 130 in FIG. 1 supporting communication by data units 304a and 304b.

In this non-limiting embodiment, data units 304a and 304b are electronic devices that interface backhaul to an IP network, each of which can support one or more multiple massive MIMO (multi-input-multi-output) units (MMUs) MMUs 306a-3063d. The data units 304a and 304b can be equipped with at least one of modems, digital signal processors (DSPs), FPGAs (field programmable gate arrays), and memory units. The data units 304a and 304b can processes information bits to generate intermediate signals that can be passed to the MMUs 306a-306d for conversion into radio signals. The radio signals can then be transmitted via massive MIMO antennas. In some embodiments, MMUs 306a-306d may have processing power, in which case the MMUs 306a-306d include modems, DSPs, FPGAs, and memory units, in addition to RF (radio frequency) hardware and massive MIMO antennas. In some embodiments, a data unit and an MMU can be implemented in a base station, such as base station 200 in FIG. 2.

Figure 4:
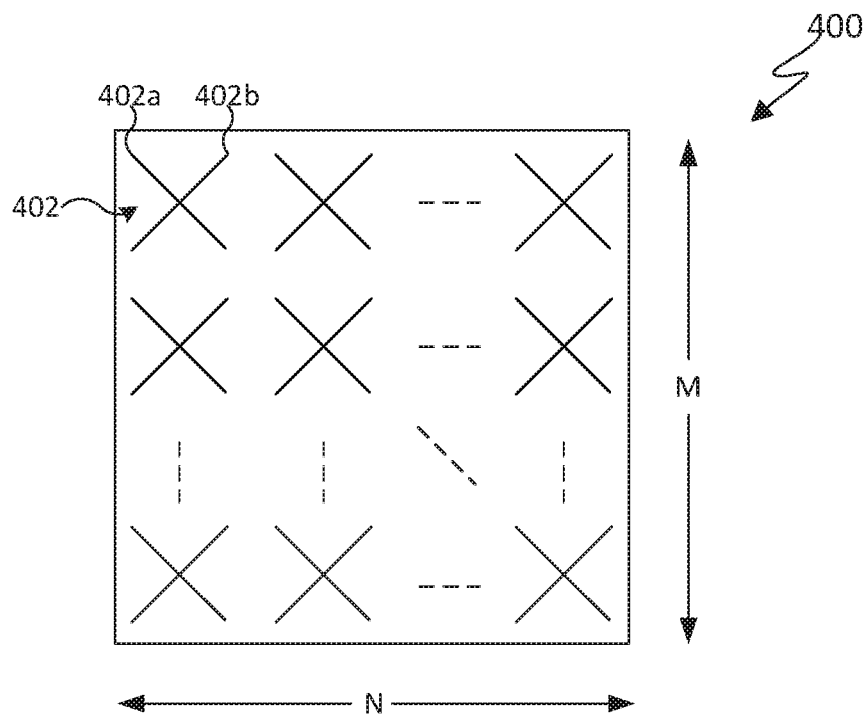
FIG. 4 illustrates an exemplary antenna for MU-MIMO communication according to various embodiments of this disclosure.

FIG. 4 illustrates an exemplary antenna for MU-MIMO communication according to various embodiments of this disclosure. The antenna 400 can be attached to MMUs, such as MMUs 306a-306d in FIG. 3 for enabling communication with one or more UEs in a set of UEs.

The antenna 400 can be a FD-MIMO or mMIMO antenna panel on which X-pol antenna element pairs 402 are placed in two dimensions and arranged in M rows and N columns with antenna spacing of ($d_V$, $d_H$). Each X-pol element pair 402 comprises two antennas 402a and 402b polarized into two directions, e.g., +45 degs and −45 degs. As used herein, an antenna element pair may also be referred to in the alternative as a transceiver unit (TXRU).

Due to the structure of the planar antenna array on the BS side, the channel of 1 path on 1 antenna polarization direction can be written as the Kronecker product of the antenna response on 1 horizontal row and 1 vertical column. i.e. consider a LoS path at incident angle ($\theta$, $\phi$), the channel response (h) of the co-pol antennas can be written as:

$$h = \begin{bmatrix} h_{11} & h_{12} & \ldots & h_{1N} \\ h_{21} & h_{22} & \ldots & h_{2N} \\ \vdots & \vdots & \ddots & \vdots \\ h_{M1} & h_{M2} & \ldots & h_{MN} \end{bmatrix}, \text{ where}$$

$$h_{mn} = e^{-\frac{j2\pi d_V}{\lambda}(m-1)\cos\theta} e^{-\frac{j2\pi d_H}{\lambda}(n-1)\sin\theta\sin\phi}.$$

Denote $$h_m^V = e^{-\frac{j2\pi d_V}{\lambda}(m-1)\cos\theta}, \text{ and } h_n^H = e^{-\frac{j2\pi d_H}{\lambda}(n-1)\sin\theta\sin\phi},$$

then $h_{mn} = h_m^V \cdot h_n^H$. Similarly, the vectorized channel coefficient can be written as $h = h^V \otimes h^H$. As can be seen, obtaining horizontal and vertical dimension channels separately is sufficient to reconstruct the 3D channel.

When the BS has dual-pol antennas, approximating the co-phase between the dual pol is the same for all pairs, the channel of one path can also be approximated as the Kronecker product of 2 dimensions and the co-phase, i.e. H=[h, $\phi$h]=[$h^V \otimes h^H$, $h^V \otimes \phi h^H$]. The co-phase information can be obtained from the CSI if either dimension.

When the channel has multi-paths, e.g. P paths where P>1, the channel can be written as the linear combination of the responses of the P path channel, i.e. H=$\Sigma_{p=1 \ldots P} \gamma_p H_p$, where $H_p = [h_p, \phi_p h_p] = [h_p^V \otimes h_p^H, h_p^V \otimes \phi_p h_p^H]$. Therefore, the channel can be approximated as H=$\Sigma_{p=1 \ldots P} \gamma_p [h_p^V \otimes h_p^H, h_p^V \otimes \phi_p h_p^H]$, where $\phi_p \in \{1,-1,j,-j\}$ is the quantized co-phase feedback.

A precoder can be used to compress the channel dimension to reduce feedback overhead. Consider a CSI-RS precoder in a path direction $\theta_{p_0}$ given by:

$$g(\theta_{p_0}) = \frac{1}{\sqrt{M}}\left[1, e^{j\frac{2\pi}{\lambda}d_v\cos(\theta_{p_0})}, \ldots, e^{j\frac{2\pi}{\lambda}(M-1)d_v\cos(\theta_{p_0})}\right]^T$$

and applied on the vertical dimension (i.e., virtualizing one column of TXRUs into one CSI-RS port), then the precoded CSI seen on the UE side is of [1×N] dimension instead of [M×N], i.e.

$$\tilde{H} = g^H(\theta_{p_0})H$$

leading to:

$$\tilde{H} = \sum_{1 \leq p \leq P} \gamma_p [g^H(\theta_{p_0})h_p^V \otimes h_p^H, e^{j\beta_p}g^H(\theta_{p_0})h_p^V \otimes h_p^H].$$

Given that the beamformed pattern can be approximated as a step function, and above equation can be approximately rewritten as:

$$\tilde{H} = \gamma_{p_0}[h_{p_0}^H, e^{j\beta_p}h_{p_0}^H].$$

In this scenario, when the UE reports the most matching PMI on the horizontal dimension, it is aligned with the path in the direction of the vertical precoder, $\theta_{p_0}$. Utilizing this property, the CSI-RS precoder can be designed to align with the strongest path on one dimension to obtain the matching PMI feedback in the other dimension. On the other hand, unprecoded CSI-RS does not compress the channel dimension, and the UE will measure the channel comprising all directions.

Precoded CSI-RS refers to CSI-RS transmitted by a eNB to a UE where the associated CSI-RS ports are formed by applying precoding weights in spatial domain. Precoded CSI-RS are narrow beam reference signals compared to non-precoded. The number of associated antenna ports are typically smaller than in non-precoded CSI-RS. Non-precoded CSI-RS, also referred to herein as "unprecoded CSI-RS", refers to CSI-RS transmitted by a eNB to a UE where the associated ports are formed without applying precoding weights. Non-precoded CSI-RS are wider beam coverage reference signals. The number of associated antenna ports are typically larger than in precoded CSI-RS.

Figure 5:
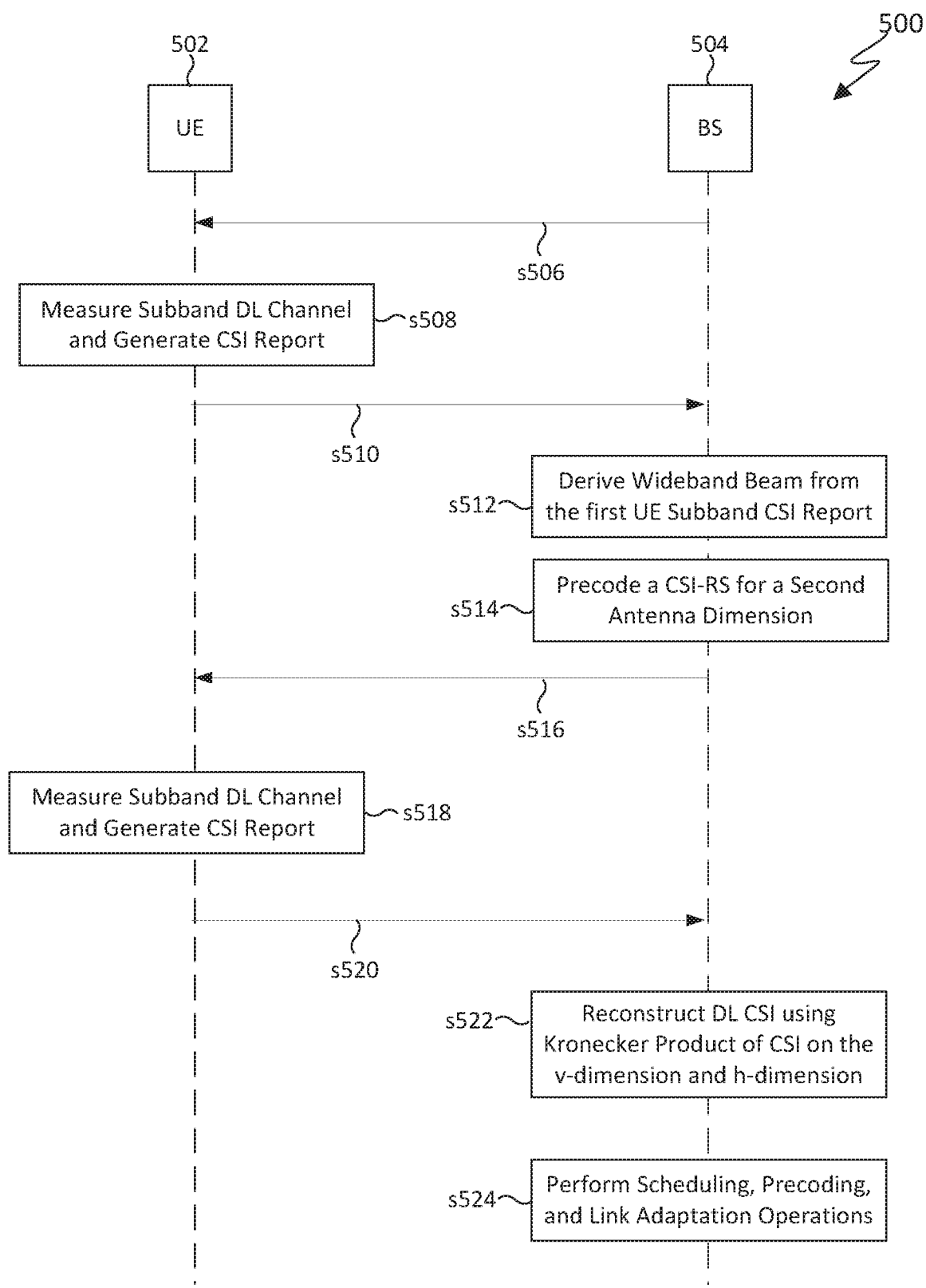
FIG. 5 illustrates a signal flow diagram between a user equipment (UE) and a base station (BS) according to various embodiments of this disclosure.

FIG. 5 illustrates a signal flow diagram between a user equipment (UE) and a base station (BS) according to various embodiments of this disclosure. The signal flow diagram 500 depicts signal flow between a UE and a BS in a networked computing system, such UE 112 and BS 102 in networked computing system 100 in FIG. 1.

In this illustrative embodiment in FIG. 5, the BS 504 utilizes two CSI processes to obtain PMI feedback in the form of subband CSI reports on the h-dimension and the v-dimension. PMI feedback quantizes the DL channel. The BS transmits an unprecoded CSI-RS on one antenna dimension, receives subband CSI report on that dimension, calculates a WB beam according to the CSI report, and then transmits precoded CSI-RS on the other dimension using the WB beam. In order to obtain 2-dimensional channel direction information and co-phase information, the CSI-RS needs to be transmitted on both polarizations in at least one antenna dimension.

In s506 the BS 504 transmits an unprecoded CSI-RS on a first antenna dimension to the UE 502. For the sake of simplicity, the first antenna dimension in this illustrative example in FIG. 5 is the v-dimension and the second antenna dimension is the h-dimension. However, in other embodiments, the first antenna dimension can be the h-dimension and the second antenna dimension can be the v-dimension.

The unprecoded CSI-RS of s506 can be transmitted on one antenna polarization (i.e., one-pol) or on both antenna polarizations (i.e., dual-pol). Non-limiting examples are given in TABLE 1, where the assumption is M=N=4 and CSI-RSs are transmitted on first column of antenna elements. In this scenario, the UE 502 chooses subband PMI from LTE 8-TX or 4-TX codebooks, respectively.

TABLE 1

| unprecoded CSI-RS mapping | | | |
|---|---|---|---|
| | CSI-RS port | Polarization | TXRUs |
| V CSI-RS transmitted on 2 pols | 15-18 | First | 1, . . . , 4 |
| | 19-22 | Second | 17, . . . , 20 |
| transmitted on 1 pol | 15-18 | First | 1, . . . , 4 |

In s508, the UE 502 measures the subband DL channel and generates a corresponding subband CSI report. The subband CSI report can include a pre-coding matrix index (PMI), rank indicator (RI), and channel quality indicator (CQI). The PMI can be from a predefined codebook, such as UL codebook 294 in FIG. 2.

When the CSI-RS is transmitted on both polarization directions in s506, the subband CSI report of UE 502 takes the form $[y_1, y_2 \ldots y_8]$, where $[y_1 \ldots y_4]$ corresponds to channel response on 4 vertical TXRU of first polarization, and $[y_5 \ldots y_8]$ corresponds to channel response on 4 vertical TXRU of second polarization. When the CSI-RS is transmitted on one polarization direction, the UE's subband CSI report takes the form $[y_1, \ldots, y_4]$, representing channel response on 4 vertical TXRU of same polarization.

In s510 the UE 502 transmits the subband CSI report (i.e., a first UE subband CSI report) of the first antenna dimension to the BS 504.

In s512, the BS derives a wideband (WB) beam from the first UE subband CSI report. In one embodiment, the WB beam can be a steering vector to elevation direction $\theta_s$ on one polarization direction, i.e.

$$\left[1, e^{-\frac{j2\pi d_v}{\lambda}\cos\theta_s}, e^{-\frac{j2\pi d_v}{\lambda}(M-1)\cos\theta_s}\right]^T.$$

The WB beam is a vector of length M.

In another embodiment, the WB beam can be chosen from a predefined codebook on the BS side, by computing which codeword has the largest correlation with the UE subband feedback, i.e.

$$b = \max_b \sum_{f=1\ldots F} b^H y_f,$$

where $b \in \{b_1, b_2 \ldots b_K\}$ is from K predefined beams on the BS side, and $y_f$ is the UE PMI feedback on subband f on one polarization direction.

In another example, the BS has a processor to monitor all UE feedback beam over time and adapts BS side codebook according to feedback distribution.

In s514 the BS 504 precodes a CSI-RS for a second antenna dimension using the WB beam derived s512. In this embodiment in FIG. 5, the second dimension is the horizontal direction. M vertical TXRUs in a column are virtualized as one beamformed horizontal TXRU by applying the vertical WB beam selected for the UE 502. One particular example of CSI-RS port mapping according to this embodiment is given in TABLE 2, assuming M=N=4, and horizontal CSI-RS transmitted on both polarizations. In this example, the UE side measures and quantizes vertically precoded channel (bH), on 8 CSI-RS horizontal ports (including x polarizations).

TABLE 2

| CSI-RS port | Polarization | TXRUs |
|---|---|---|
| 15 | First | 1, . . . , M |
| 16 | First | M + 1, . . . , 2M |
| .. | .. | .. |
| 18 | First | (N−1)M + 1, . . . , NM |
| 19 | Second | NM + 1, . . . , NM + M |
| . | . | . |
| . | . | . |
| . | . | . |
| 22 | Second | (2N−1)M + 1, . . . , 2NM |

In s516, the BS 504 transmits a precoded CSI-RS on a second antenna dimension to the UE 502.

In s518, the UE measures the subband DL channel and generates a corresponding CSI report (i.e., a second subband CSI report). The second UE subband CSI report can also include a pre-coding matrix index, rank indicator, and channel quality indicator. In one embodiment, the second subband CSI report can take the form $[x_1, x_2 \ldots x_8]$, where $[x_1 \ldots x_4]$ corresponds to channel response on 4 horizontal TXRU of the first polarization, and $[x_5 \ldots x_8]$ corresponds to channel response on 4 horizontal TXRU of the second polarization.

In another example, if V CSI-RS is transmitted on both polarizations and vertical subband CSI report is received on 2 polarizations, the precoded horizontal CSI-RS can be transmitted on 1 polarization direction instead.

In another embodiment, the BS first transmits unprecoded CSI-RS on dimension 1 and receives the corresponding subband CSI feedback. Then the BS infers a WB beam from the corresponding subband PMI and precodes CSI-RS on dimension 2. The cross-pol CSI-RS can be transmitted in: (1) Both V and H dimensions; (2) V dimension only; or (3) H dimension only.

In another embodiment, the BS first transmits unprecoded CSI-RS on dimension 1. The BS then infers a WB precoder on dimension 1 and transmits precoded CSI-RS on dimension 2, infers WB precoder on dimension 2, and then iteratively transmits precoded CSI-RS on 1 dimension and infers CSI-RS precoder on another dimension.

In yet another embodiment, in the first CSI periodicity, the BS first transmits unprecoded CSI-RS on dimension 1, infers a WB precoder on dimension 1, and transmits precoded CSI-RS on dimension 2. In the second CSI periodicity, the BS first transmits unprecoded CSI-RS on dimension 2, infers WB precoder on dimension 2, and transmits precoded CSI-RS on dimension 1. The two aforementioned processes then alternate, as discussed in more detail in FIG. 7.

In s520, the UE 502 transmits a second UE subband CSI for the second antenna dimension to the BS 504. Upon completion of s520, the BS memory now contains the following information for each UE to be MU-MIMO scheduled:

The UE subband PMI feedback on V dimension;

UE subband PMI feedback on H dimension;

Channel co-phase information is contained in at least one of V and H dimension's feedback;

The WB CSI-RS precoder on at least one of V and H dimensions; and

UE feedback CQI on both dimensions.

In s522, the BS 504 reconstructs the DL CSI using a Kronecker product of the CSI of UE 502 on the v-dimension and the h-dimension. For example, the BS 504 can reconstruct the DL channel matrix per subband on a set of TXRUs corresponding to CSI-RS port index x. The DL CSI can be constructed by calculating the Kronecker product of subband PMI from both dimensions, or by product of subband PMI from one dimension and WB precoder of another dimension.

In the embodiment that CSI-RS is transmitted on two polarizations in both antenna dimensions, and WB CSI-RS precoder applied on V dimension to form precoded CSI-RS ports in H domain, BS has the following information:

UE dual-pol subband PMI feedback on V dimension, $y=[y_1, y_2 \ldots y_{M+1} \ldots y_{2M}]^T$;

UE vertical WB precoder beam $b_v=[b_1, b_2, \ldots b_M]^T$; and

UE dual-pol subband PMI feedback on H dimension, $x=[x_1, x_2 \ldots x_{N+1} \ldots x_{2N}]^T$.

One option to construct CSI is taking Kronecker product of subband h-PMI feedback on 2 polarizations, and v-PMI feedback on 1 polarization on each subband, i.e.

$$\hat{h}=[y_1, y_2 \ldots y_M]^T \otimes [x_1, x_2 \ldots x_{N+1} \ldots x_{2N}]^T, \text{ or}$$

$$\hat{h}=[y_{M+1}, y_{M+2} \ldots y_{2M}]^T \otimes [x_1, x_2 \ldots x_{N+1} \ldots x_{2N}]^T.$$

Another option is to construct CSI product of subband H PMI feedback on 2 polarizations, and V WB precoder, i.e.

$$\hat{h}=b_v \otimes [x_1, x_2 \ldots x_{N+1} \ldots x_{2N}]^T,$$

where same $b_v$ is applied to all subbands.

In the embodiment that CSI-RS is transmitted on one polarization in V antenna dimension, 2 polarizations in H dimension and WB CSI-RS precoder applied on V dimension to form precoded CSI-RS ports in H domain, BS has information of:

UE co-pol subband PMI feedback on V dimension, $y=[y_1, y_2 \ldots y_M]^T$;

UE vertical WB precoder beam $b_v=[b_1, b_2, \ldots b_M]^T$; and

UE dual-pol subband PMI feedback on H dimension, $x=[x_1, x_2 \ldots x_{N+1} \ldots x_{2N}]^T$.

One option to construct CSI is taking Kronecker product of subband H PMI feedback on 2 polarizations, and V PMI feedback on 1 polarization on each subband, i.e. $\hat{h}=[y_1, y_2 \ldots y_M]^T \otimes [x_1, x_2 \ldots x_{N+1} \ldots x_{2N}]^T$.

Another option is to construct CSI product of subband H PMI feedback on 2 polarizations, and V WB precoder, i.e. $\hat{h}=b_v \otimes [x_1, x_2 \ldots x_{N+1} \ldots x_{2N}]^T$, where same $b_v$ is applied to all subbands.

In the embodiment that CSI-RS is transmitted on 2 polarization directions in V antenna dimension, 1 or 2 polarizations in H dimension and WB CSI-RS precoder applied on H dimension to form precoded CSI-RS ports in V dimension, BS has information of:

UE dual-pol subband PMI feedback on V dimension, $y=[y_1, y_2 \ldots y_{M+1} \ldots y_{2M}]^T$;

UE horizontal WB precoder beam $b_h=[b_1, b_2, \ldots b_M]^T$; and

UE dual-pol subband PMI feedback on H dimension, $x=[x_1, x_2 \ldots x_{N+1} \ldots x_{2N}]^T$ or co-pol subband PMI feedback on H dimension, $x=[x_1, x_2 \ldots x_N]^T$.

One option to construct CSI is taking Kronecker product of subband V PMI feedback on 2 polarizations, and H PMI feedback on either polarization on each subband, i.e. $\hat{h}=[y_1, y_2 \ldots y_{M+1} \ldots y_{2M}]^T \otimes [x_1, x_2 \ldots x_N]^T$, or $\hat{h}=[y_1, y_2 \ldots y_{M+1} \ldots y_{2M}]^T \otimes [x_{N+1} \ldots x_{2N}]^T$.

Another option is to construct CSI product of subband H PMI feedback on 2 polarizations, and V WB precoder, i.e. $\hat{h}=[y_1, y_2 \ldots y_{M+1} \ldots y_{2M}]^T \otimes b_h$, where same $b_h$ is applied to all subbands.

In the embodiment that unprecoded CSI-RS alternates on 2 dimensions, using above methods, 2 CSI can be constructed in 2 different CQI periods, based on precoded CSI-RS on 2 different dimensions. Denote the 2 CSI as $h_1$ and $h_2$, the BS can use them separately, or average them to represent the channel's direction, such as the dominant vector of $h_1 h_1^H + h_2 h_2^H$.

In s524 the BS 504 performs MU-MIMO scheduling, precoding, DL transmissions, and link adaptation operations using the reconstructed DL CSI.

In the illustrative embodiment described in FIG. 5, BS 504 can use the UE feedback CQI for scheduling. Since the CSI-RS are transmitted on 2 dimensions alternatingly, CQI is obtained on both dimensions, denoted as $CQI_1$ and $CQI_2$. From BS's scheduling view, UE's CQI can be represented by 5 options:

$CQI_1$;
$CQI_2$;
$\max(CQI_1, CQI_2)$;
$\min(CQI_1, CQI_2)$; and
instantaneous CQI.

Figure 6A:
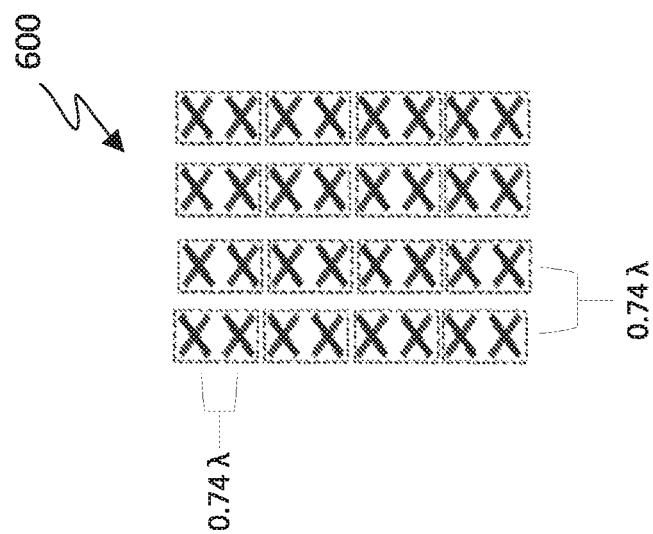
FIGS. 6A-6C illustrate transmission of CSI-RSs on different antenna dimensions according to various embodiments of this disclosure.
Figure 6B:
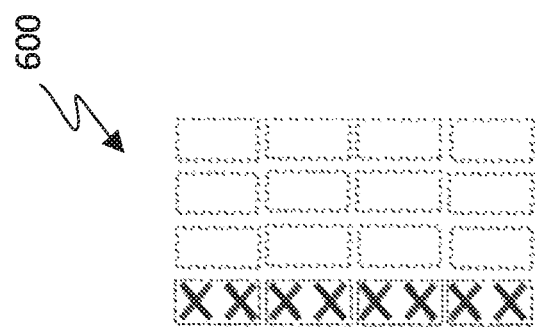
Figure 6C:
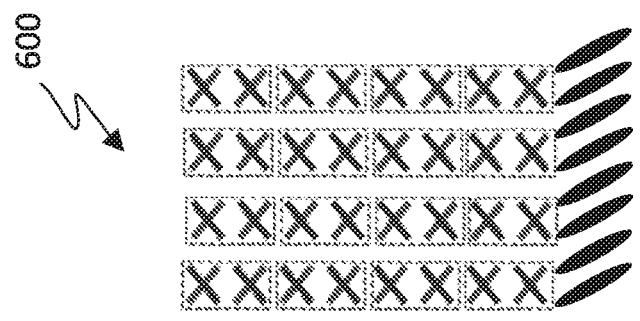

FIGS. 6A-6C illustrate transmission of CSI-RSs on different antenna dimensions according to various embodiments of this disclosure. Antenna 600 can be a FD-MIMO or mMIMO antenna panel like antenna 400 in FIG. 4. FIG. 6A shows antenna 600 with dimensions of M×N where M=N=4. Further, antenna 600 has dual polarization with antenna elements separated by 0.74λ. In FIG. 6B, a first, unprecoded CSI-RS is transmitted on a first antenna dimension. In this embodiment depicted in FIG. 6, the first antenna dimension is the vertical dimension. The first, unprecoded CSI-RS can be transmitted in a first CSI-RS process or in a first subframe set.

In response to transmitting the unprecoded CSI-RS on the first antenna dimension, a CSI report is received and used to precode a second CSI-RS that is transmitted on a second antenna dimension. In the embodiment depicted in FIG. 6B, the second antenna dimension is a horizontal antenna dimension. The second, precoded CSI-RS can be transmitted in a second CSI-RS process or in a second subframe set.

Figure 7A:
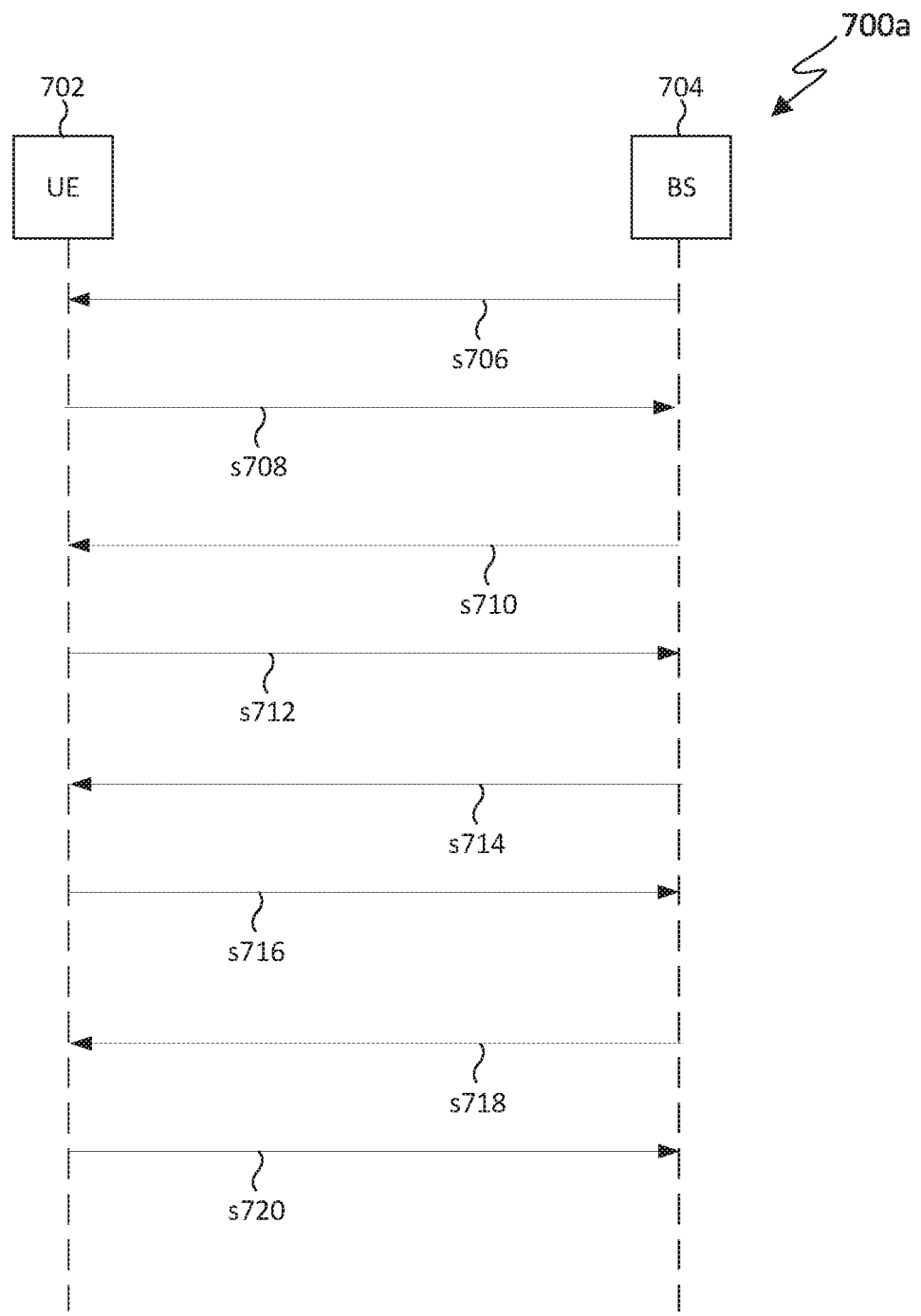
FIGS. 7A and 7B illustrate a signal flow diagram between a UE and BS depicting an alternate method for CSI retransmission according to various embodiments of this disclosure.

FIG. 7A is a signal flow diagram between a UE and BS depicting an alternate method for CSI retransmission according to various embodiments of this disclosure. The signal flow diagram 700a depicts signal flow between a UE and a BS in a networked computing system, such UE 112 and BS 102 in networked computing system 100 in FIG. 1.

In s706, BS 704 transmits an unprecoded CSI-RS to UE 702 on a first dimension, either one-pol or dual-pol. The UE 702 returns a CSI report that can include subband PMI feedback for the first dimension in s708, which the BS 704 uses to determine a wideband beam for the first dimension.

In s710 the BS 704 transmits a precoded CSI-RS for the second dimension using the wideband beam for the first dimension. In s712, the UE 702 returns a CSI report that can include subband PMI feedback for the second dimension. The UE 702 uses the subband PMI feedback for the second dimension to determine a wideband beam for the second dimension.

In one embodiment, in s714, BS 704 transmits a precoded CSI-RS on the first dimension using the wideband beam for the second dimension. In another embodiment, in s714, BS 704 transmits an unprecoded CSI-RS on the first dimension. In s716, the UE 702 returns a CSI report that can include subband PMI feedback for the first dimension. In s718, the BS 704 transmits a CSI-RS similarly to the CSI-RS transmitted in s710, e.g., precoded based on the wideband beam for the first dimension and transmitted on the second dimension. As before, in s720, the UE 702 returns a CSI report that can include subband PMI feedback for the second dimension. These operations in s714-s720 can proceed iteratively.

Figure 7B:
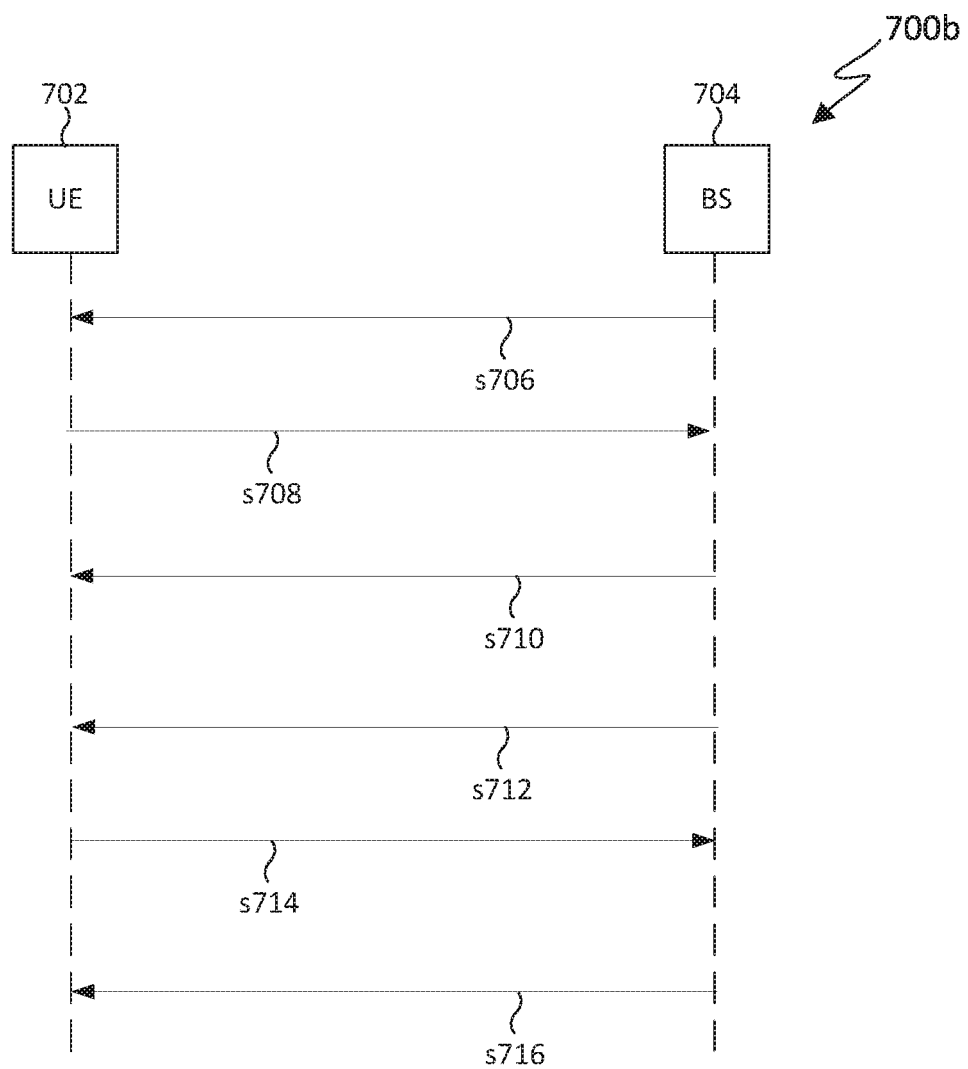

FIG. 7B is a signal flow diagram between a UE and BS depicting an alternate method for CSI retransmission according to various embodiments of this disclosure. The signal flow diagram 700a depicts signal flow between a UE and a BS in a networked computing system, such UE 112 and BS 102 in networked computing system 100 in FIG. 1.

In this embodiment of FIG. 7B, in s706, BS 704 transmits an unprecoded CSI-RS to UE 702 on a first dimension. The UE 702 returns a CSI report that can include subband PMI feedback for the first dimension in s708, which the BS 704 uses to determine a wideband beam for the first dimension. In s710 the BS 704 transmits a precoded CSI-RS for the second dimension using the wideband beam for the first dimension. In this embodiment, s706-s710 occurs in a first CSI periodicity.

In a second periodicity, the BS 704 transmits an unprecoded CSI-RS to UE 702 on a second dimension in s712, the UE 702 returns a CSI report that can include subband PMI feedback for the second dimension in s714, which the BS 704 uses to determine a wideband beam for the second dimension. In s716 the BS 704 transmits a precoded CSI-RS for the first dimension using the wideband beam for the second dimension.

In a non-limiting embodiment, process can iterate by proceeding back through operations s706-s716.

Figure 9:
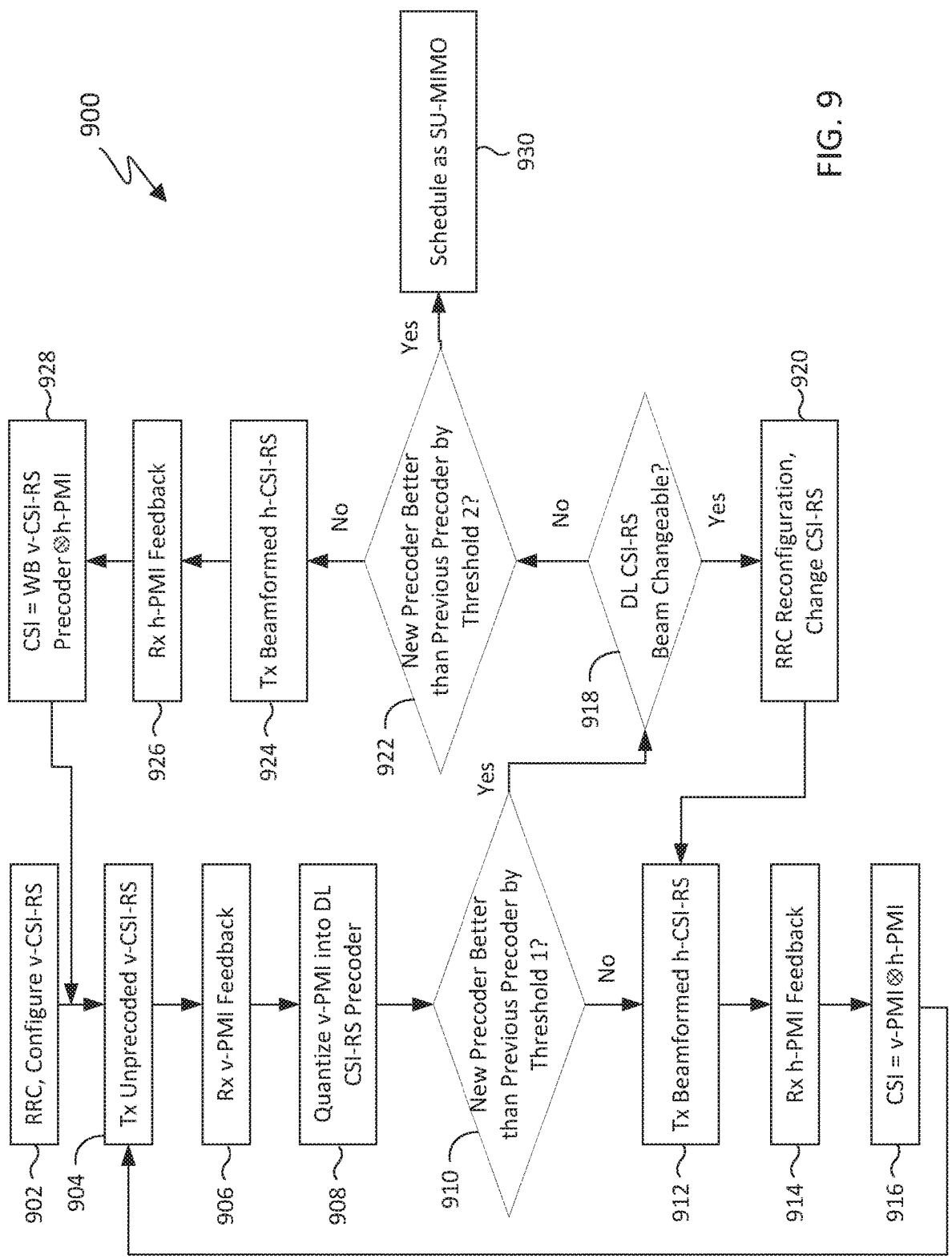
FIG. 9 illustrates another flowchart for reducing CSI-RS beam changes according to various embodiments of this disclosure.

In the previously discussed embodiments, CSI-RS is precoded on one or more dimensions of the BS antennas using WB precoding. This WB CSI-RS precoder can be inferred based on channel status information (either DL CSI which may be known through UE feedback or UL CSI which may be known through SRS). The inferred WB precoder can be updated every time new information about the channel is received, as shown in FIG. 9, which results in increased RRC overhead. However, sometimes it is not practical to change the CSI-RS precoder for UEs instantaneously when the inferred CSI-RS precoder updates. On the other hand, not changing the CSI-RS precoder results in loss in performance. In one embodiment, performance loss and RRC overhead can be balanced by utilizing a fixed WB CSI-RS precoder that does not change for a predetermined interval of time, i.e., longer intervals. In another embodiment, performance loss and RRC overhead can be balanced by utilizing a fixed RRC period and/or a hysteresis, as shown in FIG. 9.

Figure 8:
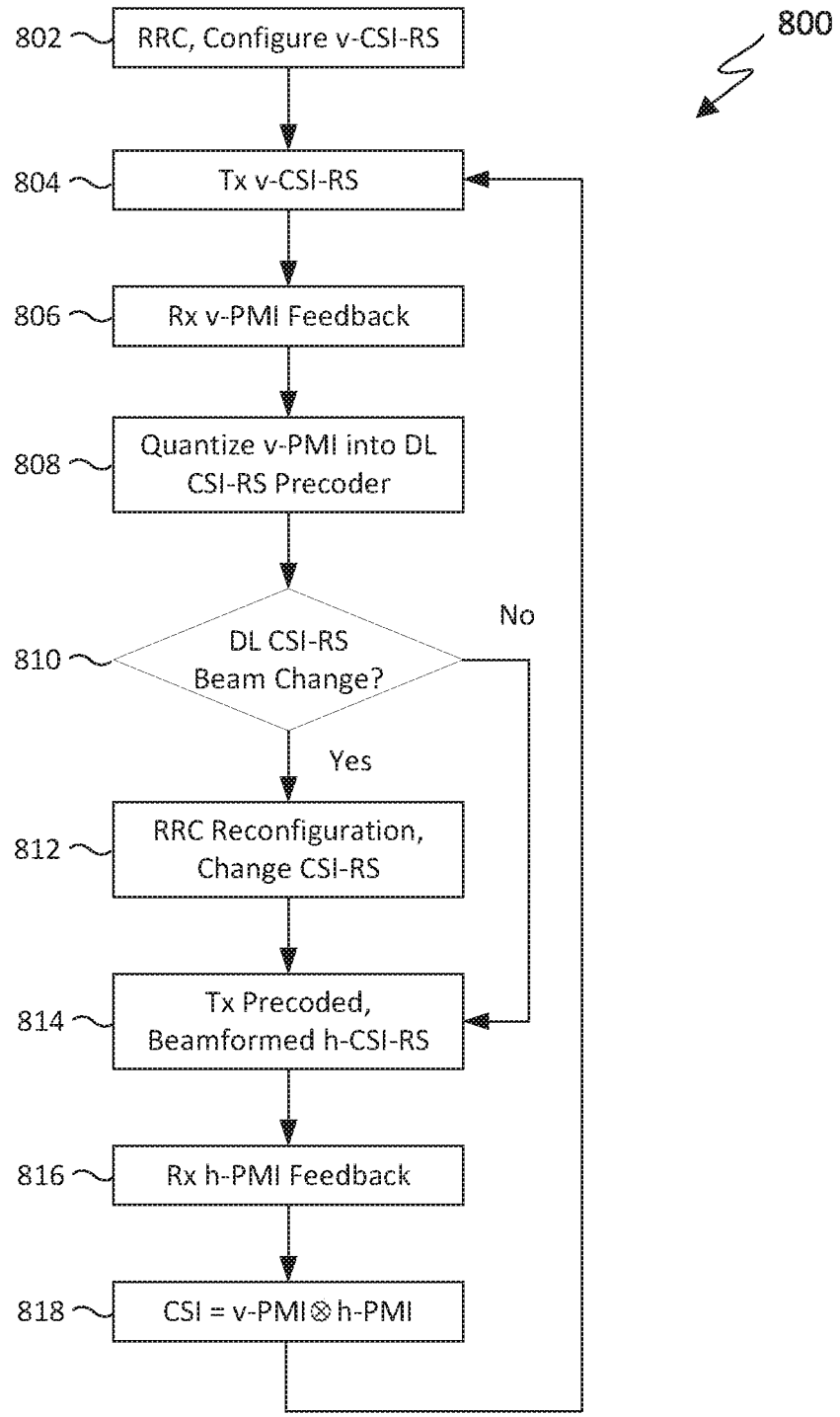
FIG. 8 illustrates a flowchart for reducing CSI-RS beam changes according to various embodiments of this disclosure.

FIG. 8 is a flowchart for unrestricted CSI-RS beam changes during WB precoding according to various embodiments of the disclosure. Operations of flowchart 800 can be implemented by a base station, such as base station 200 in FIG. 2.

Flowchart 800 assumes that a vertical beam can change freely. However, mismatch between the DL CSI-RS vertical beam and the received v-PMI can degrade performance, especially for edge UEs.

Flowchart 800 begins at operation 802 by establish RRC and configuring the v-CSI-RS for a UE. In operation 804, the v-CSI-RS is transmitted to a UE. The v-CSI-RS can be unprecoded and transmitted in subframe n.

In operation 806, v-PMI feedback is received from the UE, which is quantized into the DL CSI-RS precoder in operation 808. A determination is made in operation 810 as to whether the DL CSI-RS beam changes based on the v-PMI feedback. If the DL CSI-RS beam changes, then flowchart 800 proceeds to operation 812 where RRC is reconfigured and the CSI-RS is changed. Thereafter, the beamformed h-CSI-RS is transmitted to the UE in operation 814. In one embodiment, the beamformed h-CSI-RS is transmitted in subframe n−10x. In operation 816, the h-PMI feedback is received from the UE. In operation 818 the CSI is computed as the Kronecker product of v-PMI and h-PMI, and flowchart returns to operation 804.

Returning to operation 810, if the determination is made that DL CSI-RS beam does not change, then flowchart 800 proceeds from operation 810 to operation 814 and transmits a precoded h-CSI-RS.

Embodiments utilizing fixed WB CSI-RS precoders to balance performance loss and RRC overhead involve dividing the UEs into two different sets. The first set includes the UEs that do not suffer loss of performance from fixing the WB CSI-RS precoder. The second set includes the UEs that suffer loss of performance from fixing the WB CSI-RS precoder. To identify UEs for categorization in the second set, multiple methods may be used. For example, a first method can involve monitoring UEs' throughput and separating UEs that contribute to the degraded throughput in the cell. Another method can be monitoring the precoder requirement and separating the UEs who require frequent precoder changes, or the required changed precoder is more favorable than the available precoder by a certain threshold. The metric for favorable precoder can be the correlation with available CSI. A third method may be a combination of both previous methods. Other methods may be also used.

UEs categorized into the first set use the fixed WB CSI-RS precoder and obtain the benefit of more accurate CSI acquisition. UEs categorized in the second set can be treated according to one of two approaches. According to the first approach, UEs in the second set do not use precoded CSI-RS. Instead, unprecoded CSI-RS are used to provide a wider beam that would have better angular coverage than the misaligned narrow precoded beam. According to the second approach, UEs in the second set use the fixed WB CSI-RS precoding beam but the CSI is constructed differently. In particular, the CSI for UEs in the second set is constructed using the Kronecker product between the WB CSI-RS precoder and SB PMI feedback from the UE based on the precoded CSI-RS, which will be on the other dimension different from the dimension of the precoded CSI-RS.

Embodiments utilizing fixed RRC periods and/or hysteresis to balance performance loss and RRC overhead generally involve defining a beam change interval, identifying UEs requesting CSI-RS beam change during the beam change interval, and changing the CSI-RS beam if a requested CSI-RS beam is better than the previously available CSI-RS beam by a certain threshold. In one example, the WB beam can be used to construct the channel instead of the subband feedback, e.g., WB vertical beam instead of v-PMI. The original hybrid-KP uses v-PMI and h-PMI to construct CSI, so this example proposes to use WB vertical beam and h-PMI to construct CSI. An exemplary flowchart for this embodiment is presented in FIG. 9 that follows.

FIG. 9 is a flowchart for restricted CSI-RS beam changes for balancing performance loss with RRC overhead according to various embodiments of the disclosure. Operations of flowchart 900 can be implemented by a base station, such as base station 200 in FIG. 2.

Flowchart 900 begins at operation 902 by establish RRC and configuring the v-CSI-RS for a UE. In operation 907, the v-CSI-RS is transmitted to a UE. The v-CSI-RS can be unprecoded and transmitted in subframe n.

In operation 906, v-PMI feedback is received from the UE, which is quantized into the DL CSI-RS precoder in operation 908. A determination is made in operation 910 as to whether a newly identified precoder (i.e, a calculated precoder), based on the v-PMI feedback, is better than the previous precoder (i.e., a currently applied CSI-RS precoder) by a first threshold (i.e., Threshold 1). In a non-limiting example, the first threshold is a correlation threshold between the subband PMI feedback at RB r and with the i-th precoder as determined by:

$$\text{Corr}(i) = \Sigma_{r \ldots N_{RB}} |\Sigma_{tx_v=0}^{tx_v=3} y_{v,r}(tx_v) \cdot W_i(tx_v)|^2,$$

where $y_{v,r} = [y_{v,r}(0), y_{v,r}(1), y_{v,r}(2), y_{v,r}(3), \varphi_r[y_{v,r}(0), y_{v,r}(1), y_{v,r}(2), y_{v,r}(3)]]^T$.

If the newly identified precoder is not better than the previous precoder by a first threshold, then process 900 proceeds to operation 912 and transmits the beamformed h-CSI-RS. In one embodiment, the beamformed h-CSI-RS can be transmitted in subframe n+10×.

In operation 914, h-PMI feedback is received from the UE. In operation 916, the CSI is computed by taking the Kronecker product of v-PMI and h-PMI. For example, a subband r with v-PMI feedback:

$$y_{v,r} = [y_{v,r}(0), y_{v,r}(1), y_{v,r}(2), y_{v,r}(3), \varphi_r[y_{v,r}(0), y_{v,r}(1), y_{v,r}(2), y_{v,r}(3)]]^T,$$

and h-PMI feedback:

$$x_{h,r} = [x_{h,r}(0), x_{h,r}(1), x_{h,r}(2), x_{h,r}(3), x_{h,r}(4), x_{h,r}(5), x_{h,r}(6), x_{h,r}(7)].$$

The 32TX CSI for scheduling and beamforming weight calculation can be constructed as:

$$H_r = y_r[1:4] \otimes x_r = \begin{bmatrix} y_{v,r}(0) x_{h,r} \\ y_{v,r}(1) x_{h,r} \\ y_{v,r}(2) x_{h,r} \\ y_{v,r}(3) x_{h,r} \end{bmatrix}.$$

In some embodiments, this process is iterative and flowchart 900 proceeds from operation 916 back to operation 904.

Returning to operation 910, if the determination is made that the newly identified precoder (i.e., the calculated precoder) is better than the previous precoder (i.e., currently applied CSI-RS precoder) by the first threshold, then flowchart 900 proceeds to operation 918 and makes a subsequent determination as to whether the DL CSI-RS beam can be changed. In a non-limiting example, the DL CSI-RS beam cannot be changed in the fixed RRC beam change interval.

If the DL CSI-RS can be changed, the flowchart 900 proceeds to operation 920 and reconfigures the RRC and changes the CSI-RS before proceeding to operation 912 to transmit the beamformed h-CSI-RS.

Returning to operation 918, if the determination is made that the DL CSI-RS beam cannot be changed, then flowchart 900 proceeds to operation 922 and makes a subsequent determination as to whether the newly identified precoder is better than the previous precoder by a second threshold (i.e., Threshold 2). In a non-limiting example, the second threshold can be a correlation threshold between the requested CSI-RS beam and the previously available CSI-RS beam.

If the determination is made in operation 922 that the newly identified precoder is better than the previous precoder by the second threshold, then flowchart 900 proceeds to operation 930 and schedules the UE as a SU-MIMO. However, if the determination is made in operation 922 that the newly identified precoder is not better than the previous precoder by the second threshold, then flowchart 900 proceeds to operation 924 and transmits a beamformed h-CSI-RS to the UE. Thereafter, in operation 926 h-PMI feedback is received from the UE.

In operation 928, CSI is computed by taking the Kronecker product of the WB v-CSI-RS precoder and the h-PMI. In one embodiment, where vertical WB beam weight:

$$W = [W_1, W_2, W_3, W_4]^T,$$

and for subband r with h-PMI feedback:

$$x_{h,r} = [x_{h,r}(0), x_{h,r}(1), x_{h,r}(2), x_{h,r}(3), x_{h,r}(4), x_{h,r}(5), x_{h,r}(6), x_{h,r}(7)].$$

The 32Tx CSI for scheduling and beamforming weight calculation can be constructed as:

$$H_r = W \otimes x_r = \begin{bmatrix} W_1 x_{h,r} \\ W_2 x_{h,r} \\ W_3 x_{h,r} \\ W_4 x_{h,r} \end{bmatrix}.$$

Figure 10A:
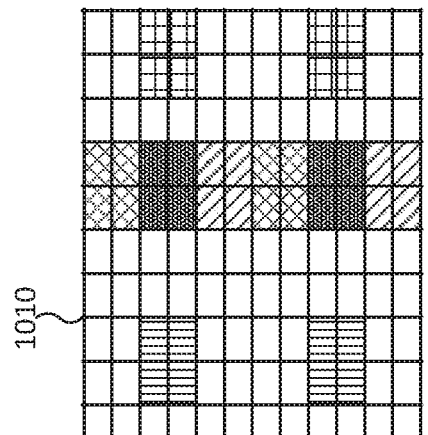
FIGS. 10A and 10B illustrate unprecoded and precoded CSI-RSs according to various embodiments of this disclosure.
Figure 10A:
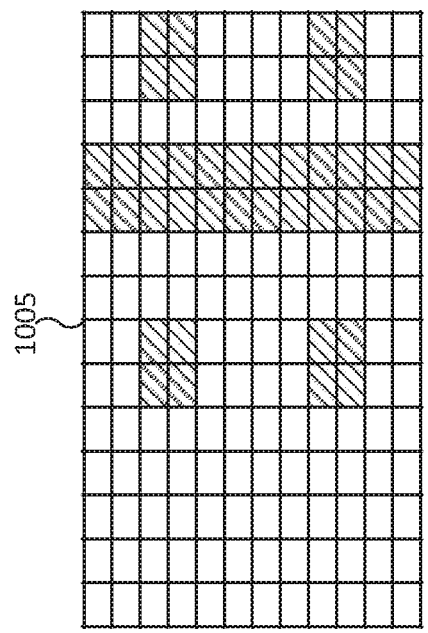
Figure 10B:
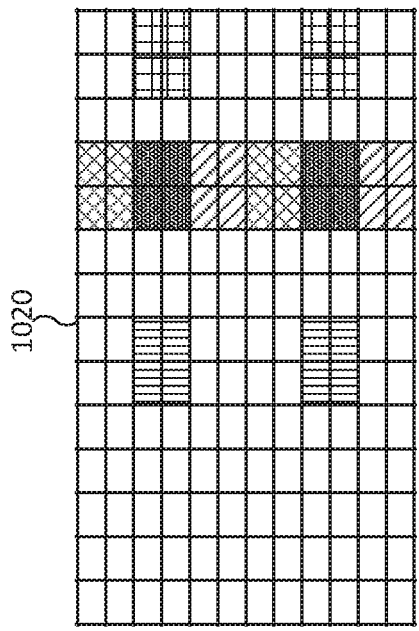
Figure 10B:
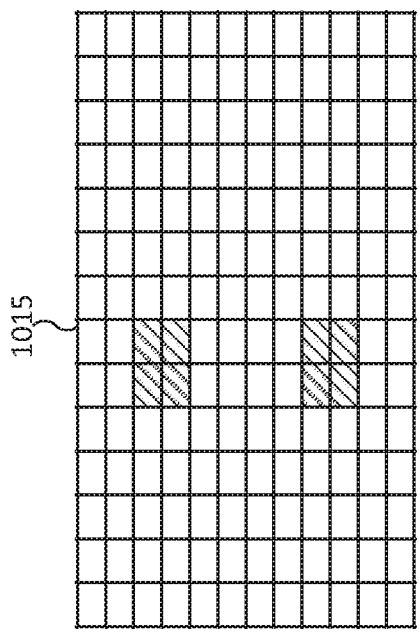

FIGS. 10A and 10B illustrate unprecoded and precoded CSI-RSs according to various embodiments of this disclosure. FIG. 10A depicts an unprecoded CSI-RS 1005 in the vertical dimension, and a precoded CSI-RS 1010 in the horizontal dimension. The CSI-RS 1005 and CSI-RS 1010 can be transmitted in one CSI-RS process according to Transmission Mode 9. FIG. 10B depicts an unprecoded CSI-RS 1015 in the vertical dimension and a precoded CSI-RS 1020 in the horizontal dimension. The CSI-RS 1015 and CSI-RS 1020 can be transmitted in two CSI-RS processes according to Transmission Mode 10.

Figure 11:
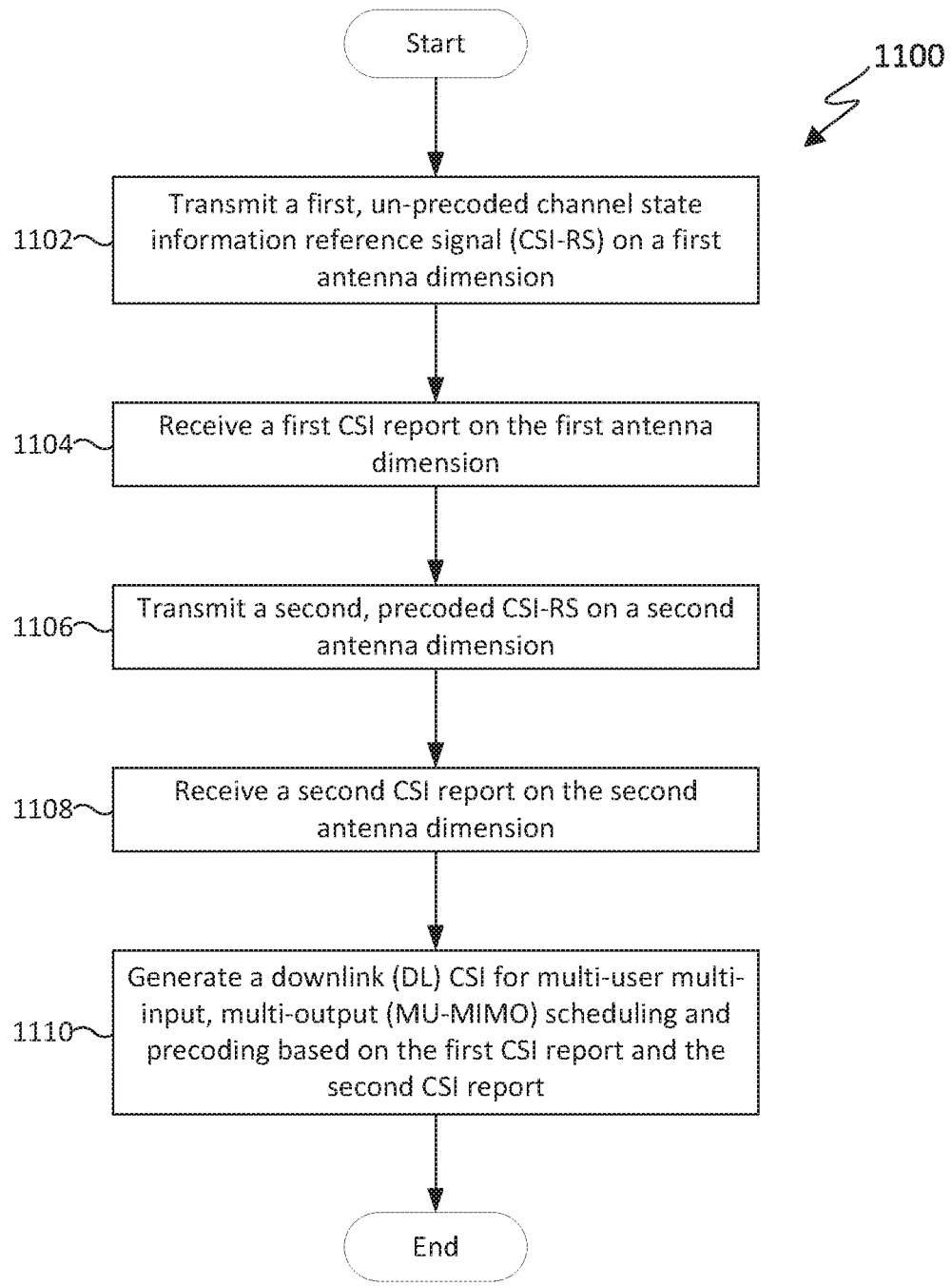
FIG. 11 illustrates a flowchart of a process for FDD channel state information (CSI) acquisition according to various embodiments of this disclosure.

FIG. 11 is a flowchart of a process for CSI acquisition according to various embodiments of this disclosure. The operations of flowchart 1100 can be performed in a base station, such as base station 200 in FIG. 2.

Flowchart 1100 begins at operation 1102 by transmitting a first, unprecoded channel state information reference signal (CSI-RS) on a first antenna dimension.

In operation 1104, a first CSI report on the first antenna dimension is received. In some embodiments, the first CSI report is a subband CSI report. In other embodiments, the first CSI report is a wideband CSI report.

In operation 1106, a second, precoded CSI-RS on a second antenna dimension is transmitted. In one embodiment, the CSI-RS on the second antenna dimension is precoded using a WB beam identified from a predefined set of WB beams for precoding CSI-RSs which has the highest correlation with a precoding matrix index (PMI) from the first CSI report.

In operation 1108 a second CSI report on the second antenna dimension is received. In some embodiments, the second CSI report is a subband CSI report. In other embodiments, the second CSI report is a wideband CSI report.

In operation 1110, a downlink (DL) CSI for multi-user multi-input, multi-output (MU-MIMO) scheduling and precoding is generated based on the first CSI report and the second CSI report. In some embodiments, the DL CSI is generated by computing one of (i) a Kronecker product of a precoding matrix index (PMI) of the first antenna dimension and a PMI of the second antenna dimension or (ii) a Kronecker product of a wideband (WB) beam inferred from the first CSI report to precode the second CSI-RS, and a subband PMI of the second antenna dimension.

In some embodiments of the process depicted in flowchart 1100, when the first antenna dimension is a vertical dimension, the second antenna dimension is a horizontal dimension. In other embodiments of the process depicted in flowchart 1100, when the first antenna dimension is the horizontal dimension, the second antenna dimension is the vertical dimension.

In some embodiments of the process depicted in flowchart 1100, the precoded CSI-RS can be sent alternatingly on the two dimensions so that a third CSI-RS is transmitted on the first antenna dimension, wherein the third CSI-RS is precoded based on the second CSI report.

In a non-limiting embodiment, to reduce overhead associated with CSI-RS beam changes, the wideband beam precoder obtained from the first CSI report in operation 1104, which is used to precode the second CSI-RS, can be maintained for a fixed period of time. Thereafter, a subset of UEs experiencing performance loss due to the wideband beam precoder during the fixed period of time is identified from the set of UEs, and a DL CSI for this subset of UEs can be generated based on a third CSI report on the first antenna dimension and a fourth CSI report on the second antenna dimension. The third CSI report is received in response to an unprecoded CSI-RS transmitted on the first antenna dimension and the fourth CSI report is received in response to an unprecoded CSI-RS transmitted on the second antenna dimension. In another non-limiting embodiment, the subset of UEs experiencing performance loss due to the wideband beam precoder during the fixed period of time is identified from the set of UEs, and a DL CSI for this subset of UEs can be generated based on a Kronecker product between the wideband beam precoder and a subband PMI from the second CSI-RS.

In another embodiment, operation 1106 can include optional steps to reduce overhead associated with CSI-RS beam changes. These steps can include a first step of determining whether a calculated DL CSI-RS precoder is better than a current DL CSI-RS precoder by a first threshold; a second step of precoding the second CSI-RS with the current DL CSI-RS precoder when the calculated DL CSI-RS precoder is not better than the current DL CSI-RS precoder by the first threshold; and a third step of precoding the second CSI-RS with the calculated DL CSI-RS precoder when the calculated DL CSI-RS precoder is better than the current DL CSI-RS precoder by the first threshold and when a DL CSI-RS beam associated with the current DL CSI-RS precoder is allowed to change. These steps can also include a fourth step of determining whether the calculated DL CSI-RS precoder is better than the current DL CSI-RS precoder by a second threshold when the DL CSI-RS beam is not allowed to change. In this embodiment, the second threshold is less than the first threshold. A fifth step includes precoding the second CSI-RS with the current DL CSI-RS precoder when the calculated DL CSI-RS precoder is not better than the current DL CSI-RS precoder by the second threshold; and a sixth step includes generating the DL CSI based on a Kronecker product of a wideband precoder of the first antenna dimension and a subband PMI from the second antenna dimension obtained from the second CSI report.

Although this disclosure has been described with an exemplary embodiment, various changes and modifications may be suggested to one skilled in the art. It is intended that this disclosure encompass such changes and modifications as fall within the scope of the appended claims.

What is claimed is:
1. A base station comprising:
a transceiver for communicating with a set of user equipments (UEs), the transceiver configured to:
  transmit a first channel state information reference signal (CSI-RS) on a first antenna dimension, wherein the first CSI-RS is unprecoded;
  receive a first CSI report on the first antenna dimension, wherein the first CSI report comprises a precoding matrix index (PMI), a rank indicator (RI), and channel quality indicator (CQI) for the first antenna dimension;
  transmit a second CSI-RS on a second antenna dimension, wherein the second CSI-RS is precoded using a wideband (WB) beam based on the first CSI report; and receive a second CSI report on the second antenna dimension, wherein the second CSI report comprises a PMI, a RI, and a CQI for the second antenna dimension; and a processor operably connected to the transceiver, the processor configured to generate, based on a Kronecker product between a WB beam precoder and the PMI from the second CSI report, a downlink (DL) CSI for multi-user multi-input, multi-output (MU-MIMO) scheduling and precoding based on the first CSI report and the second CSI report.

2. The base station of claim 1, wherein:
when the first antenna dimension is a vertical dimension, the second antenna dimension is a horizontal dimension; and
when the first antenna dimension is the horizontal dimension, the second antenna dimension is the vertical dimension.

3. The base station of claim 1, wherein:
the processor is further configured to precode the second CSI-RS based on the first CSI report; and
the transceiver is further configured to transmit the first CSI-RS and the second CSI-RS iteratively.

4. The base station of claim 1, wherein:
the processor is further configured to:
precode the second CSI-RS based on the first CSI report;
precode a third CSI-RS based on the second CSI report; and
precode a fourth CSI-RS based on a third CSI report on the first antenna dimension; and
the transceiver is further configured to:
transmit the third CSI-RS on the first antenna dimension;
transmit the fourth CSI-RS on the second antenna dimension; and
transmit the third CSI-RS and the fourth CSI-RS iteratively.

5. The base station of claim 1, wherein to generate the DL CSI the processor is further configured to calculate one of (i) a Kronecker product of the PMI of the first antenna dimension and the PMI of the second antenna dimension or (ii) a Kronecker product of a WB beam inferred from the first CSI report to precode the second CSI-RS, and the PMI of the second antenna dimension.

6. The base station of claim 1, wherein to precode the second CSI-RS using the WB beam precoder obtained from the first CSI report, the processor is further configured to:
maintain, for a fixed period of time, the WB beam precoder that is predefined;
identify, from the set of UEs, a subset of UEs experiencing performance loss due to the WB beam precoder during the fixed period of time; and
generate the DL CSI for the subset of UEs during the fixed period of time based on a Kronecker product of a PMI in a third CSI report on the first antenna dimension and a PMI in a fourth CSI report on the second antenna dimension, wherein the third CSI report is received in response to an unprecoded or precoded CSI-RS transmitted on the first antenna dimension, and wherein the fourth CSI report is received in response to a precoded CSI-RS transmitted on the second antenna dimension.

7. The base station of claim 1, wherein to precode the second CSI-RS, the processor is further configured to:

determine a fixed period of time during which CSI-RS precoders do not change, a first correlation threshold, and a second correlation threshold that is less than the first correlation threshold;
determine whether a calculated DL CSI-RS precoder, based on a most recently received CSI report, is better than a currently available DL CSI-RS precoder by the first correlation threshold;
when the calculated DL CSI-RS precoder is not better than the currently available DL CSI-RS precoder by the first correlation threshold, precoding the second CSI-RS with the currently available DL CSI-RS precoder; and
when the calculated DL CSI-RS precoder is better than the currently available DL CSI-RS precoder by the first correlation threshold and when a DL CSI-RS beam associated with the currently available DL CSI-RS precoder has been unchanged for more than the fixed period of time, precoding the second CSI-RS with the calculated DL CSI-RS precoder.

8. The base station of claim 7, wherein the processor is further configured to:
determine whether the calculated DL CSI-RS precoder is better than the currently available DL CSI-RS precoder by the second correlation threshold;
when the calculated DL CSI-RS precoder is not better than the currently available DL CSI-RS precoder by the second correlation threshold, and when the currently available DL CSI-RS precoder has not been fixed for more than the fixed period of time, precode the second CSI-RS with the currently available DL CSI-RS precoder, and generate the DL CSI based on a Kronecker product of a WB precoder of the first antenna dimension and the PMI from the second antenna dimension obtained from the second CSI report; and
when the calculated DL CSI-RS precoder is better than the currently available DL CSI-RS precoder regardless of the fixed period of time, precode the second CSI-RS with the calculated DL CSI-RS precoder, and generate the DL CSI based on a Kronecker product of a PMI for the most recently received CSI report for the first antenna dimension and the PMI for the second antenna dimension obtained from the second CSI report.

9. The base station of claim 1, wherein to precode the second CSI-RS, the processor is further configured to:
identify, from a predefined set of WB beams for precoding CSI-RSs, a WB beam having a highest correlation with the PMI from the first CSI report; and
precode the second CSI-RS using the identified WB beam.

10. A method in a base station for channel state information (CSI) acquisition from a set of user equipments (UEs), the method comprising:
transmitting a first channel state information reference signal (CSI-RS) on a first antenna dimension, wherein the first CSI-RS is unprecoded;
receiving a first CSI report on the first antenna dimension, wherein the first CSI report comprises a precoding matrix index (PMI), a rank indicator (RI), and channel quality indicator (CQI) for the first antenna dimension;
transmitting a second CSI-RS on a second antenna dimension, wherein the second CSI-RS is precoded using a wideband (WB) beam precoder based on the first CSI report;

receiving a second CSI report on the second antenna dimension, wherein the second CSI report comprises a PMI, a RI, and a CQI for the second antenna dimension; and generating, based on a Kronecker product between a WB beam precoder and the PMI from the second CSI report, a downlink (DL) CSI for multi-user multi-input, multi-output (MU-MIMO) scheduling and precoding based on the first CSI report and the second CSI report.

11. The method of claim 10, wherein:
when the first antenna dimension is a vertical dimension, the second antenna dimension is a horizontal dimension; and
when the first antenna dimension is the horizontal dimension, the second antenna dimension is the vertical dimension.

12. The method of claim 10, further comprising:
precoding the second CSI-RS based on the first CSI report; and
transmitting the first CSI-RS and the second CSI-RS iteratively.

13. The method of claim 10, further comprising:
precoding the second CSI-RS based on the first CSI report;
precoding a third CSI-RS based on the second CSI report;
precoding a fourth CSI-RS based on a third CSI report on the first antenna dimension;
transmitting the third CSI-RS on the first antenna dimension;
transmitting the fourth CSI-RS on the second antenna dimension; and
transmitting the third CSI-RS and the fourth CSI-RS iteratively.

14. The method of claim 10, wherein generating the DL CSI comprises one of (i) a Kronecker product of the PMI of the first antenna dimension and the PMI of the second antenna dimension or (ii) a Kronecker product of a WB beam inferred from the first CSI report to precode the second CSI-RS, and the PMI of the second antenna dimension.

15. The method of claim 10, wherein the second CSI-RS is precoded using the WB beam precoder obtained from the first CSI report, the method further comprising:
maintaining, for a fixed period of time, the WB beam precoder that is predefined;
identifying, from the set of UEs, a subset of UEs experiencing performance loss due to the WB beam precoder during the fixed period of time; and
generating the DL CSI for the subset of UEs during the fixed period of time based on a Kronecker product of a PMI in a third CSI report on the first antenna dimension and a PMI in a fourth CSI report on the second antenna dimension, wherein the third CSI report is received in response to an unprecoded or precoded CSI-RS transmitted on the first antenna dimension, and wherein the fourth CSI report is received in response to a precoded CSI-RS transmitted on the second antenna dimension.

16. The method of claim 10, wherein transmitting the second CSI report on the second antenna dimension further comprises:
determining a fixed period of time during which CSI-RS precoders do not change, a first correlation threshold, and a second correlation threshold that is less than the first correlation threshold;
determining whether a calculated DL CSI-RS precoder, based on a most recently received CSI report, is better than a currently available DL CSI-RS precoder by the first correlation threshold;

when the calculated DL CSI-RS precoder is not better than the currently available DL CSI-RS precoder by the first correlation threshold, precoding the second CSI-RS with the currently available DL CSI-RS precoder; and when the calculated DL CSI-RS precoder is better than the currently available DL CSI-RS precoder by the first correlation threshold and when a DL CSI-RS beam associated with the currently available DL CSI-RS precoder has been unchanged for more than the fixed period of time, precoding the second CSI-RS with the calculated DL CSI-RS precoder.

17. The method of claim 16, further comprising:
determining whether the calculated DL CSI-RS precoder is better than the currently available DL CSI-RS precoder by the second correlation threshold, wherein the second correlation threshold is less than the first correlation threshold;
when the calculated DL CSI-RS precoder is not better than the currently available DL CSI-RS precoder by the second correlation threshold, and when the currently available DL CSI-RS precoder has not been fixed for more than the fixed period of time, precoding the second CSI-RS with the currently available DL CSI-RS precoder, and generating the DL CSI based on a Kronecker product of a WB precoder of the first antenna dimension and the PMI from the second antenna dimension obtained from the second CSI report; and
when the calculated DL CSI-RS precoder is better than the currently available DL CSI-RS precoder regardless of the fixed period of time, precoding the second CSI-RS with the calculated DL CSI-RS precoder, and generating the DL CSI based on a Kronecker product of a PMI for the most recently received CSI report for the first antenna dimension and the PMI for the second antenna dimension obtained from the second CSI report.

18. The method of claim 10, wherein transmitting the second CSI-RS on the second antenna dimension further comprises:
identifying, from a predefined set of WB beams for precoding CSI-RSs, a WB beam having a highest correlation with the PMI from the first CSI report; and
precoding the second CSI-RS using the identified WB beam.

19. A non-transitory computer-readable medium storing instructions that, when executed by a processor of a base station configured to communicate with a set of user equipments (UEs), causes the base station to:
transmit a first channel state information reference signal (CSI-RS) on a first antenna dimension, wherein the first CSI-RS is unprecoded;
receive a first CSI report on the first antenna dimension, wherein the first CSI report comprises a precoding matrix index (PMI), a rank indicator (RI), and channel quality indicator (CQI) for the first antenna dimension;
transmit a second CSI-RS on a second antenna dimension, wherein the second CSI-RS is precoded using a wideband (WB) beam precoder based on the first CSI report;
receive a second CSI report on the second antenna dimension, wherein the second CSI report comprises a PMI, a RI, and a CQI for the second antenna dimension; and
generate, based on a Kronecker product between a WB beam precoder and the PMI from the second CSI report, a downlink (DL) CSI for multi-user multi-input, multi-output (MU-MIMO) scheduling and precoding based on the first CSI report and the second CSI report.

20. The non-transitory computer-readable medium of claim 19, wherein instructions for generating the DL CSI include further instructions that, when executed by the processor of the base station, causes the base station to compute one of (i) a Kronecker product of the PMI of the first antenna dimension and the PMI of the second antenna dimension or (ii) a Kronecker product of a WB beam inferred from the first CSI report to precode the second CSI-RS, and the PMI of the second antenna dimension.

* * * * *